United States Patent
Decrop et al.

(10) Patent No.: US 11,487,400 B1
(45) Date of Patent: Nov. 1, 2022

(54) AGGREGATED MULTIDIMENSIONAL USER INTERFACE DISPLAY WITH ELECTRONIC PEN FOR HOLOGRAPHIC PROJECTION

(71) Applicant: International Business Machines Corporation, Armonk, NY (US)

(72) Inventors: Clement Decrop, Arlington, VA (US); Sarbajit K. Rakshit, Kolkata (IN); Abhishek Malvankar, White Plains, NY (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/445,035

(22) Filed: Aug. 13, 2021

(51) Int. Cl.
| | |
|---|---|
| *G06F 3/048* | (2013.01) |
| *G06F 3/04815* | (2022.01) |
| *G06N 20/00* | (2019.01) |
| *G06F 3/0487* | (2013.01) |
| *G06F 3/0354* | (2013.01) |

(52) U.S. Cl.
CPC ...... *G06F 3/04815* (2013.01); *G06F 3/03545* (2013.01); *G06F 3/03546* (2013.01); *G06F 3/0487* (2013.01); *G06N 20/00* (2019.01)

(58) Field of Classification Search
CPC ............. G06F 3/04815; G06F 3/03545; G06F 3/0487; G06N 20/00
See application file for complete search history.

(56) References Cited

U.S. PATENT DOCUMENTS

| | | | |
|---|---|---|---|
| 7,036,938 B2* | 5/2006 | Wang | H04N 9/14 |
| | | | 348/E9.026 |
| 7,738,151 B2 | 6/2010 | Garner et al. | |
| 8,514,194 B2 | 8/2013 | Lawrence et al. | |
| 9,557,855 B2 | 1/2017 | Lawrence et al. | |
| 9,575,562 B2 | 2/2017 | Cheng et al. | |
| 9,594,461 B1 | 3/2017 | Daniel | |
| 9,886,102 B2 | 2/2018 | Hosenpud | |
| 10,564,420 B2 | 2/2020 | Bharti et al. | |
| 10,635,291 B2* | 4/2020 | Hinckley | G06F 3/04845 |
| 10,656,763 B1* | 5/2020 | Moscovich | G06F 3/0446 |
| 10,939,367 B1* | 3/2021 | Koshy | H04W 48/16 |
| 11,360,616 B1* | 6/2022 | Proie | G06F 3/044 |

(Continued)

OTHER PUBLICATIONS

Kondo et al., A_Pen-Grip_Shaped_Device_for_Estimating_Writing_Pressure_and_Altitude, 2019, IEEE, 6 pages.*

(Continued)

*Primary Examiner* — Linh K Pham
(74) *Attorney, Agent, or Firm* — Yee & Associates, P.C.

(57) ABSTRACT

A computer-implemented method, system, and computer program product for generating an aggregated user interface display. The aggregated user interface display includes a physical display of a computing device and a projected display from an electronic pen. Operator interactions with the aggregated user interface display are saved as historical information. The historical information is used to determine a configuration for the aggregated user interface display. The computing device and the electronic pen are controlled to implement the configuration for the aggregated user interface display.

20 Claims, 8 Drawing Sheets

(56) References Cited

U.S. PATENT DOCUMENTS

| | | | | |
|---|---|---|---|---|
| 2003/0193478 | A1* | 10/2003 | Ng | G06F 3/014 345/168 |
| 2005/0264525 | A1* | 12/2005 | Adams | G06F 3/0304 345/156 |
| 2008/0042969 | A1* | 2/2008 | Baker | H04N 9/3179 345/156 |
| 2008/0165163 | A1* | 7/2008 | Bathiche | G06F 3/03543 345/179 |
| 2010/0103178 | A1* | 4/2010 | Song | G06F 3/03545 345/473 |
| 2012/0206330 | A1* | 8/2012 | Cao | G06F 3/0346 345/156 |
| 2014/0028635 | A1* | 1/2014 | Krah | G06F 3/041 345/179 |
| 2015/0049031 | A1* | 2/2015 | Maruoka | G06T 11/001 345/173 |
| 2015/0277583 | A1* | 10/2015 | Kasahara | G06F 3/0488 345/179 |
| 2015/0363035 | A1* | 12/2015 | Hinckley | G06F 3/04883 345/173 |
| 2016/0073075 | A1* | 3/2016 | Baker | H04N 9/3185 359/741 |
| 2016/0154484 | A1* | 6/2016 | Kampf | G06F 1/3259 345/179 |
| 2016/0179222 | A1* | 6/2016 | Chang | G06F 3/03545 345/179 |
| 2017/0083157 | A1* | 3/2017 | Vice | H04N 9/3185 |
| 2017/0300170 | A1 | 10/2017 | Hinckley et al. | |
| 2019/0113986 | A1* | 4/2019 | Bikumala | G06F 3/017 |
| 2019/0369754 | A1* | 12/2019 | Roper | G06F 1/3215 |
| 2020/0108653 | A1* | 4/2020 | Kurani | B43K 29/001 |
| 2020/0125190 | A1* | 4/2020 | Jung | G06F 3/03545 |
| 2020/0310561 | A1* | 10/2020 | Connellan | G06F 3/03545 |
| 2020/0363880 | A1* | 11/2020 | Bogan | G06F 3/03545 |
| 2021/0149531 | A1* | 5/2021 | Kasatani | G06F 3/03545 |
| 2021/0303836 | A1* | 9/2021 | Kasatani | G06F 3/04883 |

OTHER PUBLICATIONS

Gesslein et al, Pen-based Interaction with Spreadsheets in Mobile Virtual Reality, 2020, IEEE, 13 pages.*

Andrzej et al., Multimodal human-computer interfaces based on advanced video and audio analysis; 2013 IEEE; 8 pages.*

Lope et al., Can Multiple Tactile Pressure Stimulation in Gripping Position Induce Virtual Force Directions?, 2010, IEEE, 6 pages.*

"New ultrathin display could soon beam 3D holograms from Phones", https://www.siliconrepublic.com/machines/ultrathin-display-3d-holograms-phones.

"The future of 3D holograms comes into focus", https://www.computerworld.com/article/3249605/the-future-of-3d-holograms-comes-into-focus.html.

"Our Stunning 3D Holographic displays", https://virtualongroup.com/3d-holographic-displays/.

"Seeing in 3D: Advancements in Holographic Display Technology", https:www.radiantvisionsystems.com/blog/seeing-3d-advancements-holographic-display-technology.

"Samsung Patents Phone Disply that Projects Star Wars-Like Holograms", https://www.tomsguide.com/US/samsung-holographic-display-phones, news-28866.html.

Pictures in the Air: 3-D Printing with Light: https://www.scientificamerican.com/video/pictures-in-the-air-3-d printing-wit-light/.

"Wacom Unveils VR Pen Built for the next creative future", https://roadtovr.com/wacom-unveils-vr-pen-built-next-creative-future/.

Digital pen, https://en.wikipedia.org/wiki/Digital_pen.

Samsung S Pen, https://www.samung.com/us/mobile/mobile-accessories/tablets/s-pen-ej-pt820bbeguj/.

Microsoft digital pen, https://www.microsoft.com/en-us/windows/digital-smart-pen.

Apple Pencils, https://www.apple.com/in/apple-pencil/.

* cited by examiner

AGGREGATED MULTIDIMENSIONAL USER INTERFACE DISPLAY WITH ELECTRONIC PEN FOR HOLOGRAPHIC PROJECTION

BACKGROUND

1. Field

The disclosure relates generally to user interface systems and methods for mobile computing and other computing devices. More particularly, illustrative embodiments relate to a computer implemented method, a system, and a computer program product for generating a personalized aggregated multidimensional user interface display based on historical information and using an electronic pen for holographic three-dimensional projection or two-dimensional projection on a flat surface.

2. Description of the Related Art

A user interface is a point of interaction between a computer and a human operator of the computer. A typical user interface includes one or more displays for presenting information from the computer to the human operator. Various user input devices may be used by the operator to interact with the displayed information or otherwise provide input to the computer.

Electronic pens and similar devices are examples of user input devices for operator interactions with a computing device. Electronic pens may enable various methods of interacting with a computing device by a human operator, such as handwriting, hand drawing, menu selection, and navigating content. Examples of electronic pens include an active stylus, digital pen, and smart pen.

An active stylus is an input device that allows a user to write directly onto the display of a computing device. An active stylus includes electronic components and may have features such as touch sensitivity, input buttons, memory, data transmission capabilities, and electronic erasers. An active stylus also may be referred to as an active pen.

A digital pen is an input device that captures handwriting or drawing by a user as the digital pen is used in the same manner as a conventional pen or other writing instrument. The movement of a digital pen across a surface is captured as analog information that is converted into digital data that may be stored and utilized with applications on a computing device. A digital pen includes electronic components and may have features such as touch sensitivity, input buttons, memory for storing data, and transmission capabilities. A smart pen has the same basic characteristics as a digital pen, but may have additional features, such as a voice recorder and text scanner.

Mobile computing devices are relatively small computing devices that are typically small enough to hold and operate in the hand. Smartphones and tablet computers are examples, without limitation, of such mobile computing devices. The display screen of a mobile computing device, and, therefore, the user interface, may be relatively small, which may make the typical mobile computing device more difficult to use.

Electronic pens may be used as input devices to improve the useability of mobile computing devices. Currently, however, any improvement in the user interfaces of mobile computing devices by the use of electronic pens has been limited.

Therefore, it would be desirable to have a method and apparatus that take into account at least some of the issues discussed above, as well as other possible issues.

SUMMARY

Illustrative embodiments provide a computer-implemented method of generating an aggregated user interface display. The aggregated user interface display comprises a physical display of a computing device and a projected display from an electronic pen. Operator interactions with the aggregated user interface display are received and saved as historical information. The historical information is used to determine a configuration for the aggregated user interface display. The computing device and the electronic pen are controlled to implement the configuration for the aggregated user interface display.

Illustrative embodiments also provide a system for generating an aggregated user interface display. The aggregated user interface display comprises a physical display of a computing device and a projected display from an electronic pen. The system comprises an aggregated user interface display engine that is configured to: receive operator interactions with the aggregated user interface display, save the operator interactions as historical information, use the historical information to determine a configuration for the aggregated user interface display, and control the computing device and the electronic pen to implement the configuration for the aggregated user interface display.

Illustrative embodiments also provide a computer program product for generating an aggregated user interface display. The aggregated user interface display comprises a physical display of a computing device and a projected display from an electronic pen. The computer program product comprises a computer readable storage medium having program instructions embodied therewith. The program instructions are executable by a device to cause the device to: receive operator interactions with the aggregated user interface display, save the operator interactions as historical information, use the historical information to determine a configuration for the aggregated user interface display, and control the computing device and the electronic pen to implement the configuration for the aggregated user interface display.

Other variations are possible, as described below.

DETAILED DESCRIPTION

Figure 1:
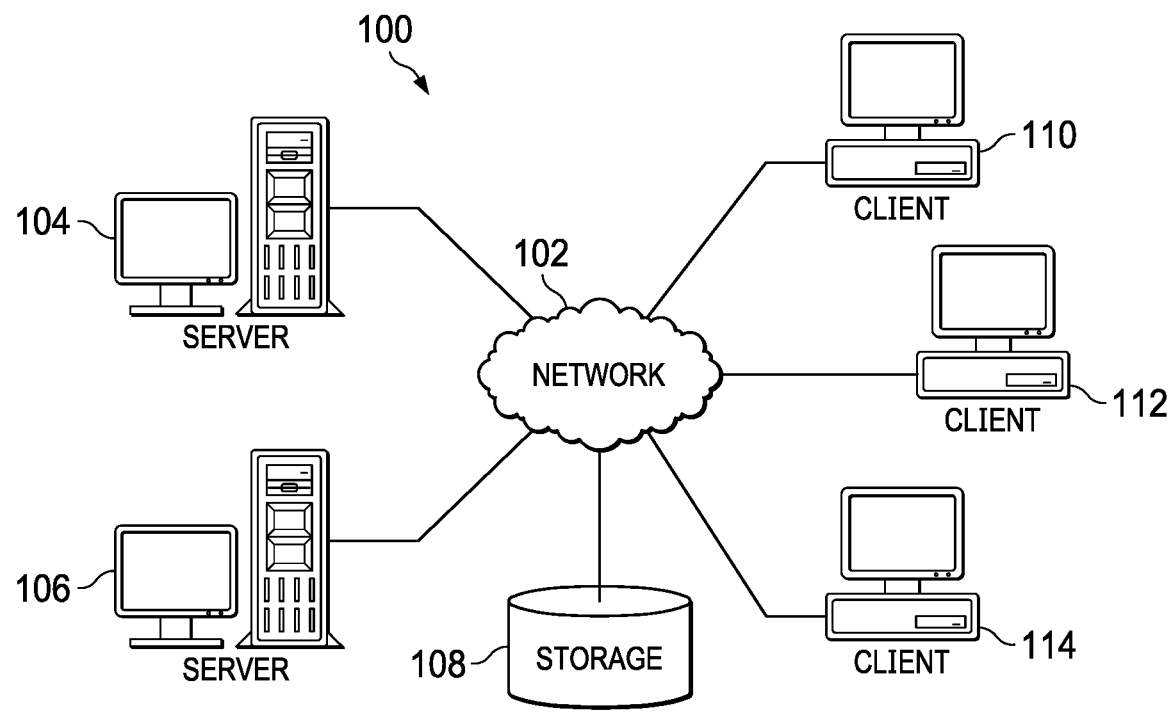
FIG. 1 is a pictorial representation of a network of data processing systems in which illustrative embodiments may be implemented.

The illustrative embodiments recognize and take into account various considerations. For example, the illustrative embodiments recognize and take into account that electronic pens and similar devices are used as operator input devices in user interfaces for mobile computing and other computing devices. However, improvements in the useability of mobile computing devices afforded by the use of electronic pens and similar devices has been limited.

For example, currently an active stylus may be used to provide input to a mobile computing device by an operator using the active stylus to interact directly with a two-dimensional physical display screen on the mobile computing device. However, the physical display on a mobile computing device, such as a smartphone or tablet computer, is typically limited in size, which may limit the amount of information that may be displayed or make it more difficult for an operator to read the information that is displayed. Current use of an active stylus for operator interaction with a mobile computing device does not improve the amount of information that may be displayed on the mobile computing device or the ability of an operator to read any information that is displayed on the mobile computing device.

Currently, a digital or smart pen may be used by the operator of a mobile computing device to interact with the mobile computing device by handwriting and hand drawing on a surface or otherwise at a location away from the mobile computing device. A digital or smart pen does not operate to provide input for a computing device by any interaction between the digital or smart pen and information displayed by the computing device. Therefore, a digital or smart pen may be used to interact with a mobile computing device at a location away from the mobile computing device without displaying information by the mobile computing device on an external display at the location away from the mobile computing device. Current use of a digital or smart pen for operator interaction with a mobile computing device thus does not expand the user interface display of the mobile computing device to include an external display and does not improve the ability of an operator to interact with information displayed by the mobile computing device.

Mobile computing devices, such as smartphones and tablet computers, typically include display devices that provide two-dimensional displays of information for operator interaction. A typical current mobile computing device thus may not provide for a three-dimensional display of information for operator interaction with the mobile computing device. Moreover, at present, electronic pens and similar devices are used to interact with mobile computing devices in two dimensions. Currently, electronic pens and similar devices may not be used by an operator to interact with a three-dimensional display of a mobile computing device.

Computing devices may display information on more than one display device. However, at present, user interfaces for mobile computing devices do not provide for the aggregated display of information on more than one two-dimensional or three-dimensional display or on the combination of a two-dimensional display and a three-dimensional display. Moreover, current user interface systems and methods may not provide for the aggregated display of information by a mobile computing device on more than one display based on the context of operator interactions with the user interface display. In particular, current systems and methods do not provide for the aggregated display of information on more than one display based on operator interactions with the user interface display using an electronic pen or similar device.

Illustrative embodiments expand and improve upon the current limited uses and functionality of electronic pens to provide improved operator interaction in user interfaces. Illustrative embodiments may improve the user interfaces of any appropriate computing devices or systems using any appropriate display devices. In particular, illustrative embodiments will enrich operator interactions with mobile computing devices, such as smartphones and tablet computers.

Illustrative embodiments provide a method, system, and computer program product for improving the user interfaces of mobile computing and other computing devices by the use of an electronic pen that is capable of projecting a three-dimensional holographic display in midair. The projected display from the electronic pen may be combined with a two-dimensional physical display on a computing device to create an aggregated user interface display for the computing device that improves operator interactions with the computing device. The electronic pen also may be used as an input device by an operator to interact with the aggregated user interface display, including with the three-dimensional holographic display that is projected in midair by the electronic pen.

Illustrative embodiments provide for the automatic configuration of an aggregated user interface display including a two-dimensional physical display on a computing device and a two-dimensional or three-dimensional projected display from an electronic pen that is paired with the computing device. For example, illustrative embodiments may determine automatically an appropriate location for the projected display and an appropriate distribution of content information to be displayed between the physical display and the projected display.

The configuration for an aggregated user interface may be determined automatically based on historical information and using artificial intelligence. For example, operator interactions with the aggregated user interface display in the context of types of content information displayed, grip patterns of the operator holding the electronic pen, and relative positions of the computing device and electronic pen may be saved as historical information. The historical information may be used to train the artificial intelligence, which may then be used to determine the configuration for the aggregated user interface display. The computing device and electronic pen may then be controlled to implement the configuration of the aggregated user interface display in the physical display on the computing device and the projected display from the electronic pen.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computers 110, 112, and 114 can be, for example, computers, workstations, or network computers. In the depicted example, server computer 104 provides information, such as boot files, operating system images, and applications to client computers 110, 112, and 114. In this illustrative example, server computer 104, server computer 106, storage unit 108, and client computers 110, 112, and 114 are network devices that connect to network 102 in which network 102 is the communications media for these network devices.

Client computers 110, 112, and 114 are clients to server computer 104 in this example. Network data processing system 100 may include additional server computers, client computers, and other devices not shown. Client computers 110, 112, and 114 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client computers 110, 112, or 114 over network 102 for use on client computers 110, 112, or 114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
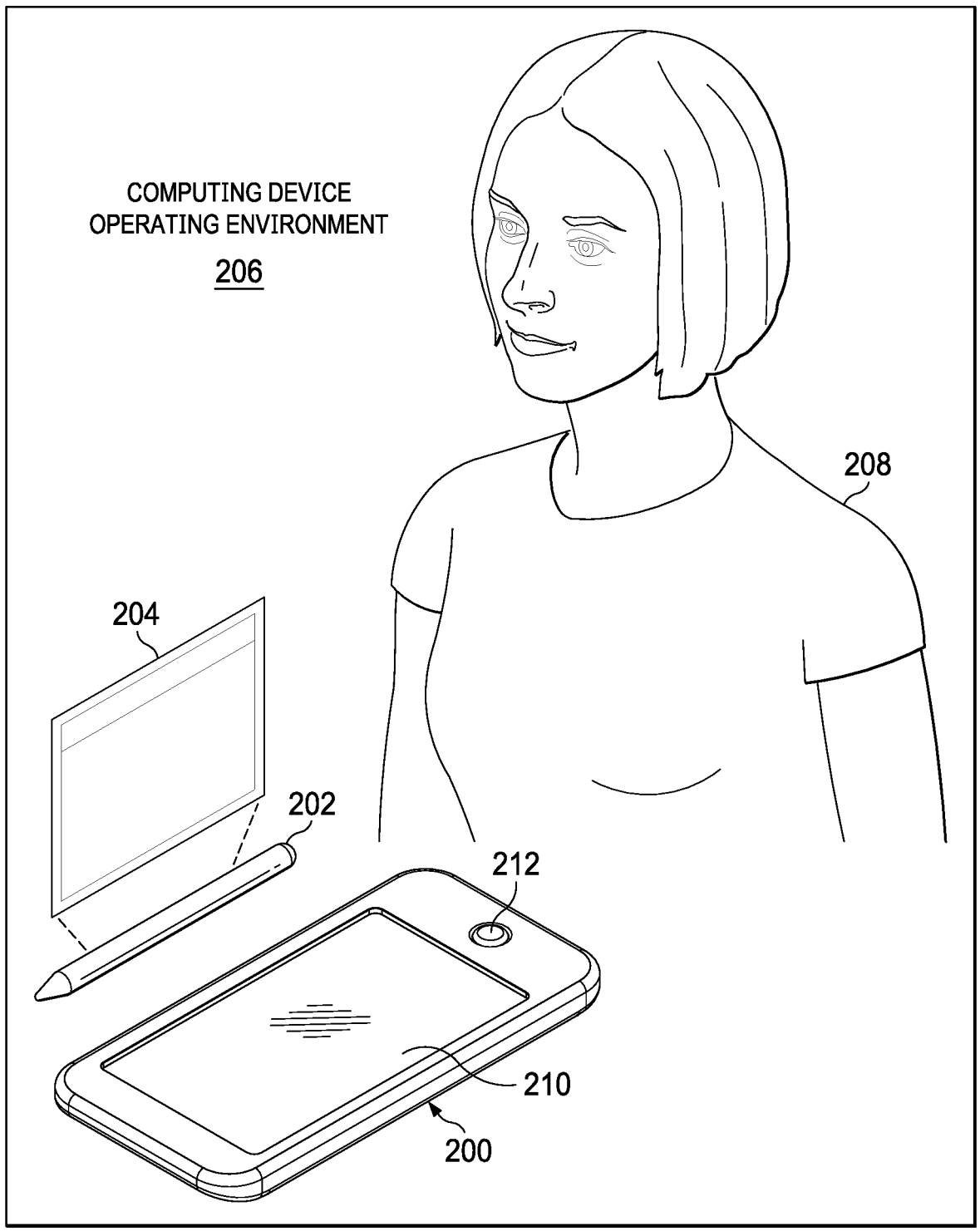
FIG. 2 is a perspective view illustration of a mobile computing device, electronic pen, and projected display in a computing device operating environment in accordance with an illustrative embodiment.

Turning to FIG. 2, a perspective view illustration of mobile computing device 200, electronic pen 202, and projected display 204 in computing device operating environment 206 is depicted in accordance with an illustrative embodiment. Computing device operating environment 206 includes any environment in which operator 208 may use mobile computing device 200 to perform any appropriate function or task. In this illustrative example, computing device operating environment 206 includes components that may be implemented in hardware, such as the hardware shown in network data processing system 100 in FIG. 1. For example, mobile computing device 200 may be an implementation of one of client computers 110, 112, and 114 in network data processing system 100 in FIG. 1.

Operator 208 may be any appropriate human user of mobile computing device 200. In this example, mobile computing device 200 is a smartphone. Mobile computing device 200 includes physical display 210. Physical display 210 may be implemented in any appropriate manner to provide a two-dimensional display of information on mobile computing device 200. For example, without limitation, physical display 210 may be a touch screen display device. In this case, operator 208 may interact with information displayed by mobile computing device 200 on physical display 210 by touching physical display 210 in an appropriate manner.

Mobile computing device 200 also includes button 212. Button 212 may be implemented in any appropriate manner to provide another way for operator 208 to provide input to mobile computing device 200. For example, without limitation, mobile computing device 200 may be implemented to allow operator 208 to interact with information displayed on physical display 210 using button 212.

Electronic pen 202 includes an elongated body and otherwise may have any appropriate size and shape to be held in the hand and used by operator 208. Electronic pen 202 may be paired with mobile computing device 200, to provide communications between electronic pen 202 and mobile computing device 200, in any appropriate manner.

Electronic pen 202 is configured to generate projected display 204. Projected display 204 may be a two-dimensional projected display or a three-dimensional holographic projected display. In any case, interactions by operator 208 with projected display 204 may be detected by electronic pen 202. Operator 208 may interact with projected display 204 in any appropriate manner. In the example shown, electronic pen 202 is set down next to mobile computing device 200. In this case, operator 208 may interact with projected display 204 using a finger or another appropriate pointing device. Alternatively, electronic pen 202 may be held in the hand by operator 208. In this case, electronic pen 202 may provide projected display 204 and operator 208 may interact with projected display 204 using electronic pen 202.

In accordance with an illustrative embodiment, projected display 204 and physical display 210 may be configured to provide together an aggregated user interface display for mobile computing device 200. In this case, information that may ordinarily be displayed only on physical display 210 is distributed for display between physical display 210 and projected display 204 in an appropriate manner. The user interface display for mobile computing device 200 is thus expanded from only physical display 210 to physical display 210 in combination with projected display 204. The overall size of the user interface display for mobile computing device 200 is thus increased, thereby increasing the amount and readability of the information that may be displayed by mobile computing device 200 and interacted with by operator 208. Moreover, as projected display 204 may be a three-dimensional holographic display, information that may be displayed more appropriately in a three-dimensional display may be displayed in the aggregated user interface display for mobile computing device 200 in more appropriate ways than the information could be displayed on two-dimensional physical display 210 alone. Therefore, the use of projected display 204 in combination with physical display 210 to provide an aggregated user interface display in accordance with an illustrative embodiment may improve the useability of mobile computing device 200.

In accordance with an illustrative embodiment, the configuration of an aggregated user interface display including projected display 204 and physical display 210 may be determined and controlled automatically. For example, historical information regarding interactions of operator 208 with projected display 204 and physical display 210 may be used to determine automatically a location at which projected display 204 is produced and the distribution of content information that is displayed between projected display 204 and physical display 210. The historical information may include information regarding interactions of operator 208 with projected display 204 and physical display 210 in the context of types of the content information displayed, relative positions of physical display 210 and electronic pen 202, and grip patterns of operator 208 holding electronic pen 202. The historical information may be used to train artificial intelligence, which then may be used to determine automatically an appropriate configuration for the aggregated user interface display for mobile computing device 200.

Figure 3:
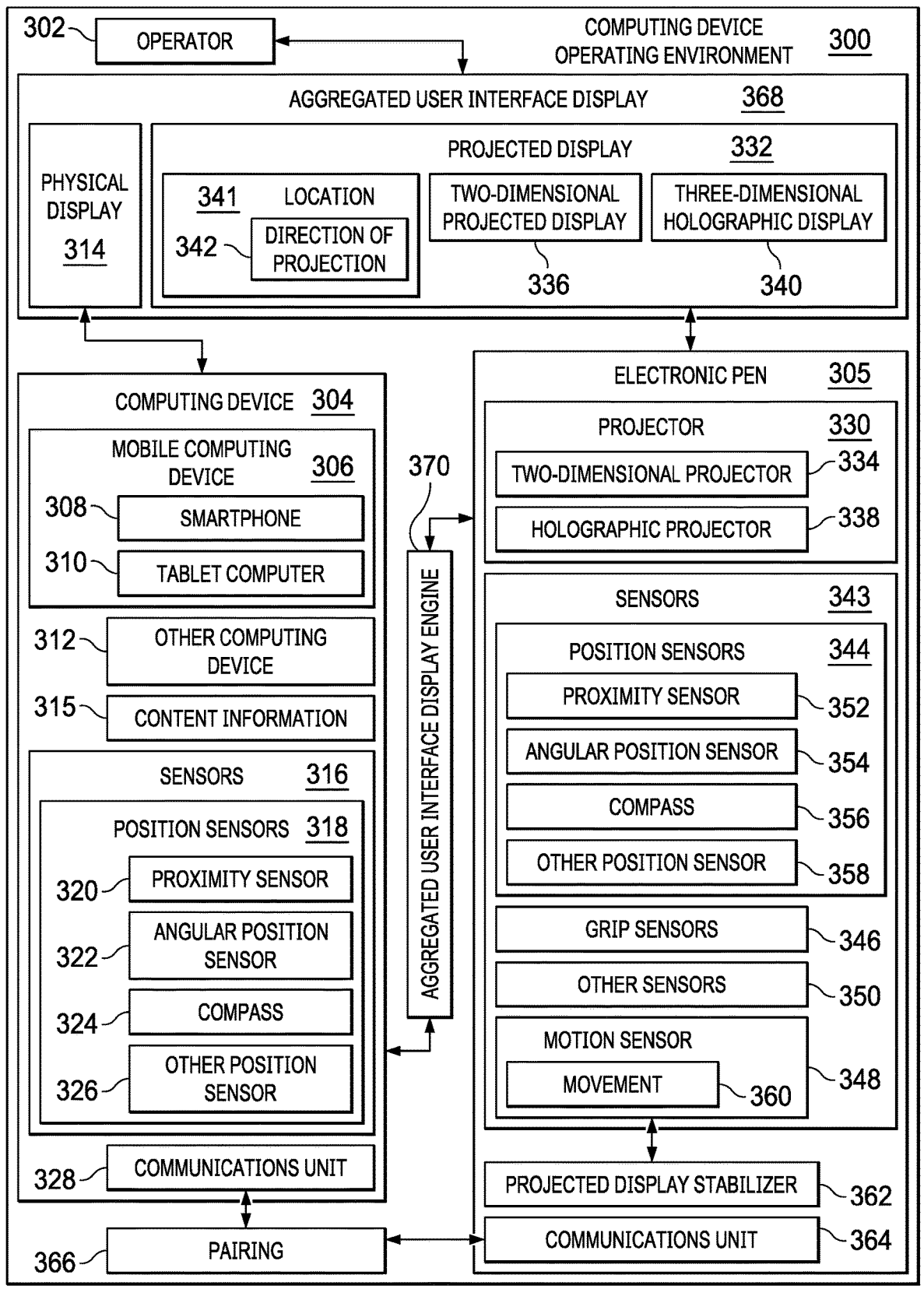
FIG. 3 is a block diagram of a computing device operating environment in accordance with an illustrative embodiment.

Turning to FIG. 3, a block diagram of computing device operating environment 300 is depicted in accordance with an illustrative embodiment. Computing device operating environment 206 in FIG. 2 is an example of one implementation of computing device operating environment 300. Computing device operating environment 300 may include any environment in which operator 302 uses computing device 304 and electronic pen 305 to interact with computing device 304. Operator 302 may be any human user of computing device 304 and electronic pen 305.

Computing device 304 may be mobile computing device 306. For example, without limitation, computing device 304 may be smartphone 308 or tablet computer 310. Alternatively, computing device 304 may be any appropriate other computing device 312, including any mobile computing device 306 other than smartphone 308 or tablet computer 310.

Computing device 304 includes physical display 314. Physical display 314 may be built in to computing device 304. Alternatively, physical display 314 may be separate or separatable from computing device 304 but connected to computing device 304 in any appropriate manner to display content information 315 from computing device 304 to operator 302 on physical display 314.

Physical display 314 may be implemented in any appropriate manner to provide a two-dimensional display of content information 315 from computing device 304 to operator 302. For example, without limitation, physical display 314 may be a touch screen display. In this case, computing device 304 may display content information 315 to operator 302 on physical display 314 and operator 302 may interact with the information displayed on physical display 314 to provide input to computing device 304 by touching physical display 314 in an appropriate manner.

Computing device 304 also may include sensors 316. For example, without limitation, sensors 316 may include position sensors 318. Position sensors may include any appropriate sensors for providing sensor information from which the position of physical display 314 on computing device 304 may be determined. In the present application, including in the claims, the position of physical display 314 may include the location of physical display 314 in three-dimensional space, the orientation of physical display 314 in three-dimensional space, or both the location and orientation of physical display 314. For example, without limitation, positions sensors 318 may include one or more of proximity sensor 320, angular position sensor 322, compass 324, other position sensor 326, or any appropriate combination of position sensors. If physical display 314 is separated from computing device 304, position sensors 318 for determining the position of physical display 314 may be included in or on physical display 314.

Computing device 304 also may include communications unit 328. As will be discussed in more detail below, communications unit 328 may be implemented in any appropriate manner to provide for communications between computing device 304 and electronic pen 305.

Electronic pen 305 includes projector 330 for producing projected display 332. For example, projector 330 may include one or both of two-dimensional projector 334 for producing two-dimensional projected display 336 as projected display 332 and holographic projector 338 for producing three-dimensional holographic display 340 as projected display 332. Projector 330 may be implemented in or on electronic pen 305 in any appropriate manner using any appropriate electronics, light sources, optics, and any other appropriate devices or combination of devices. For example, without limitation, holographic projector 338 may include a plurality of miniature embedded holographic display projectors in electronic pen 305. Two-dimensional projector 334 and holographic projector 338 may be implemented using some or all of the same components in or on electronic pen 305. For example, two-dimensional projector 334 and holographic projector 338 may be implemented as separate projectors or as a single projector that is configurable or controllable to produce both two-dimensional projected display 336 and three-dimensional holographic display 340.

Projected display 332 may be produced by projector 330 at a selectable or controllable location 341. For example, without limitation, location 341 may be a two-dimensional or three-dimensional surface or a location in midair in which projected display 332 is produced by electronic pen 305. Location 341 may be defined by direction of projection 342 from electronic pen 305 at which projected display 332 is produced by projector 330.

Electronic pen 305 includes sensors 343. For example, without limitation, sensors 343 may include one or more of position sensors 344, grip sensors 346, motion sensor 348, other sensors 350, or any appropriate combination of different types of sensors. Position sensors 344 may include any appropriate sensors for providing sensor information from which the position of electronic pen 305 may be determined. In the present application, including in the claims, the position of electronic pen 305 may include the location of electronic pen 305 in three-dimensional space, the orientation of electronic pen 305 in three-dimensional space, or both the location and orientation of electronic pen 305. For example, without limitation, positions sensors 344 may include one or more of proximity sensor 352, angular position sensor 354, compass 356, other position sensor 358, or any appropriate combination of position sensors.

In accordance with an illustrative embodiment, position information from position sensors 318 in computing device 304 may be used in combination with position information from position sensors 344 in electronic pen 305 to determine the relative positions of electronic pen 305 and physical display 314 of computing device 304. Information from sensors in computing device 304, electronic pen 305, or both computing device 304 and electronic pen 305 also may be used to determine the relative position of operator 302 to computing device 304, electronic pen 305, or both computing device 304 and electronic pen 305. For example, without limitation, position information from position sensors 318 in computing device 304 may be used in combination with position information from position sensors 344 in electronic pen 305 either alone or in combination with information from other sensors in computing device 304, electronic pen 305, or both computing device 304 and electronic pen 305, to determine the relative position of operator 302 to computing device 304 or electronic pen 305. For example, information from a camera in computing device 304 and from grip sensors 346 in electronic pen 305 are examples of information that may be used alone or in combination with other sensor information to determine the relative position of operator 302 to computing device 304 or to electronic pen 305.

Grip sensors 346 may include any appropriate sensors for providing sensor information from which grip patterns of operator 302 holding electronic pen 305 may be determined. For example, without limitation, grip sensors 346 may include one or more contact sensors that are configured and positioned on electronic pen 305 in an appropriate manner to generate grip information for identifying grip patterns of operator 302 holding electronic pen 305. For example, without limitation, a grip pattern may identify one or more of when operator 302 picks up electronic pen 305, how operator 302 holds electronic pen 305, and for how long operator 302 holds electronic pen 305. Identifying how operator 302 holds electronic pen 305 may include identifying the gripping style, applied force, stability, or other appropriate characteristics or combination of characteristics of electronic pen 305 as electronic pen 305 is held and used by operator 302.

Motion sensor 348 may be implemented in any appropriate manner to sense movement 360 of electronic pen 305. For example, without limitation, motion sensor 348 may include one or more accelerometers or other appropriate devices for generating sensor information for tracking movement 360 of electronic pen 305 when held by operator 302 or otherwise. Sensor information from motion sensor 348, identifying movement 360 of electronic pen 305, may be provided to projected display stabilizer 362. Projected display stabilizer 362 may be configured to use the sensor information from motion sensor 348 to stabilize projected display 326 produced by electronic pen 305 as electronic pen 305 is in motion. For example, without limitation, projected display stabilizer 362 may use conventional anti-shaking algorithms, such as those used in digital cameras and imagers to adjust displayed images so that the displayed images appear steady, to stabilize projected display 332. Projected display stabilizer 362 may be implemented in whole or in part in electronic pen 305 or separately from electronic pen 305 but in communication with electronic pen 305 to control projector 330 in an appropriate manner to stabilize projected display 332.

Electronic pen 305 may include communications unit 364. Communications unit 364 in electronic pen 305 and communications unit 328 in computing device 304 may be implemented in any appropriate manner to provide for communications between computing device 304 and electronic pen 305 to enable pairing 366 of computing device 304 and electronic pen 305. For example, without limitation, communications unit 328 and communications unit 364 may enable communications between computing device 304 and electronic pen 305 via a Wi-Fi wireless network, Bluetooth wireless technology, 4G or 5G broadband cellular networks, or any other appropriate communications technology using any appropriations communications protocols.

In accordance with an illustrative embodiment, physical display 314 and projected display 332 may together comprise aggregated user interface display 368 for computing device 304. Content information 315 from computing device 304 is distributed appropriately for display between physical display 314 and projected display 332 of aggregated user interface display 368. Operator 302 may interact with content information 315 presented on aggregated user interface display 368 in any appropriate manner, including using electronic pen 305.

In accordance with an illustrative embodiment, the configuration of aggregated user interface display 368 for computing device 304 is controlled automatically by aggregated user interface display engine 370. Aggregated user interface display engine 370 is configured to receive information from computing device 304 and electronic pen 305 to determine automatically an appropriate configuration of aggregated user interface display 368 for presenting content information 315 to operator 302. Aggregated user interface display engine 370 provides appropriate controls to computing device 304 and electronic pen 305 to control implementation of the configuration of aggregated user interface display 368 by controlling physical display 314 and projected display 332.

The functionality of aggregated user interface display engine 370 as described herein may be implemented in software, hardware, firmware or a combination thereof. When software is used, the operations performed by aggregated user interface display engine 370 may be implemented in program code configured to run on hardware, such as a processor unit. When firmware is used, the operations performed by aggregated user interface display engine 370 may be implemented in program code and data and stored in persistent memory to run on a processor unit. When hardware is employed, the hardware may include circuits that operate to perform the operations in aggregated user interface display engine 370.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Aggregated user interface display engine 370 may be implemented in computing device 304, in electronic pen 305, or in parts in both computing device 304 and electronic pen 305. Alternatively, aggregated user interface display engine 370 may be implemented, in whole or in part, separately from computing device 304 and electronic pen 305, but in communication with computing device 304 and electronic pen 305 in an appropriate manner. For example, without limitation, aggregated user interface display engine 370 may be implemented using a distributed computing architecture, such as edge computing.

The illustration of computing device operating environment 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4A:
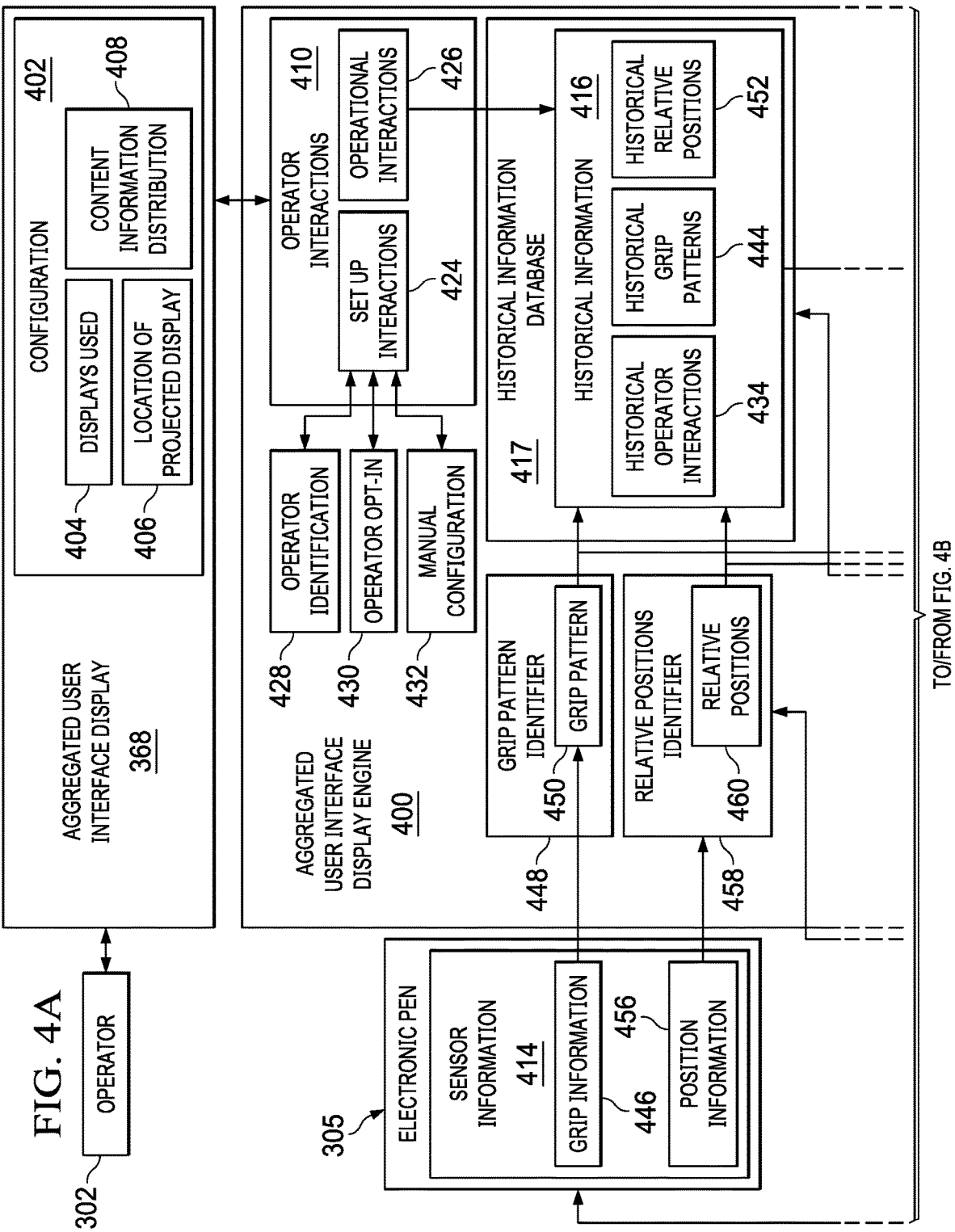
FIGS. 4A and 4B are a block diagram of an aggregated user interface display engine in accordance with an illustrative embodiment.
Figure 4B:
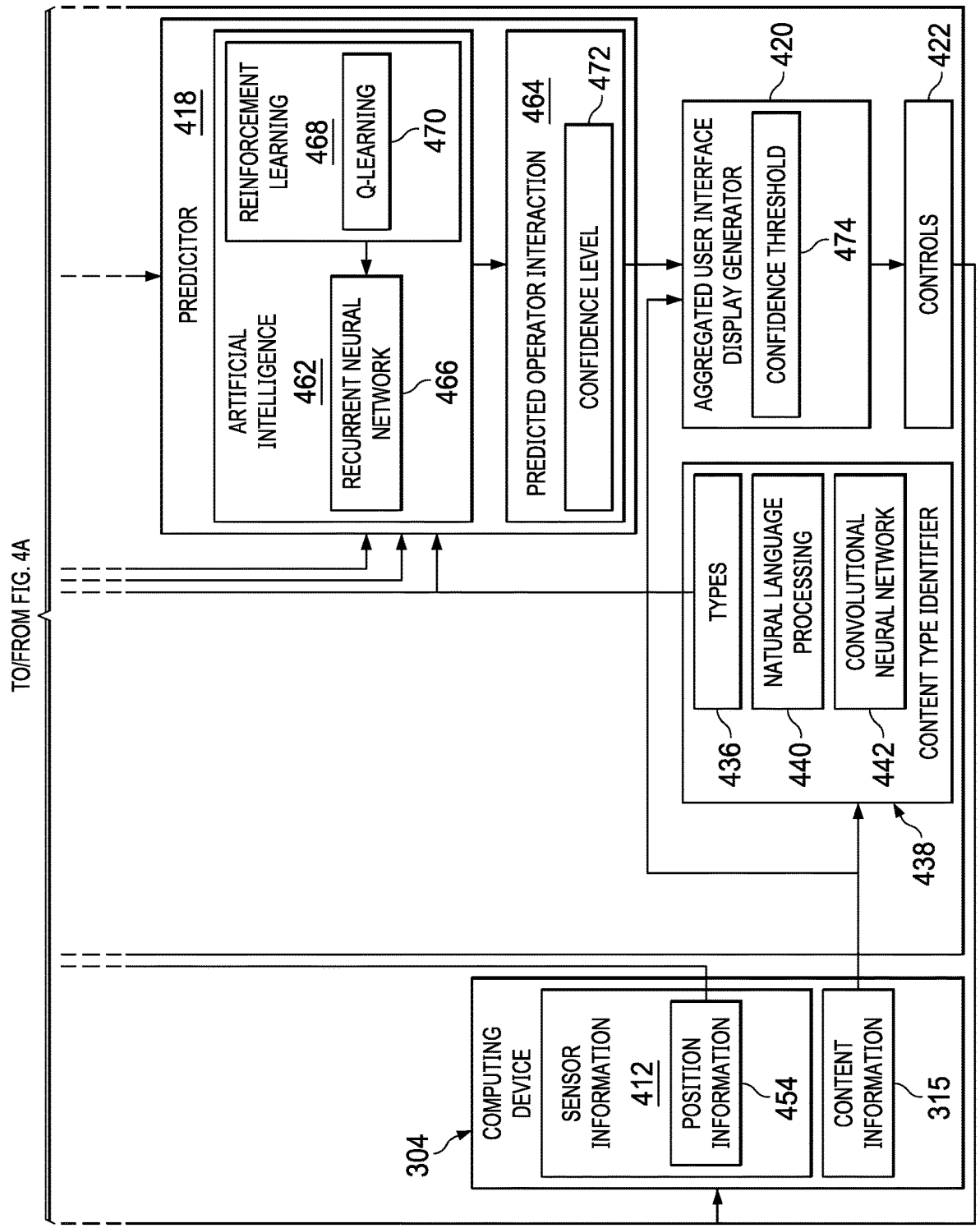

Turning to FIGS. 4A and 4B, a block diagram of an aggregated user interface display engine is depicted in accordance with an illustrative embodiment. Aggregated user interface display engine 400 is an example of one implementation of aggregated user interface display engine 370 for controlling aggregated user interface display 368 produced by computing device 304 and electronic pen 305 in FIG. 3.

Aggregated user interface display engine 400 is configured to determine automatically configuration 402 for aggregated user interface display 368 and to control computing device 304 and electronic pen 305 to implement configuration 402 for aggregated user interface display 368. Configuration 402 for aggregated user interface display 368 may include one or more of displays used 404 in aggregated user interface display 368, location of projected display 406 in aggregated user interface display 368, and content information distribution 408 for aggregated user interface display 368. Determining displays used 404 in configuration 402 for aggregated user interface display 368 may include determining whether configuration 402 for aggregated user interface display 368 includes only the physical display of computing device 304, only a projected display from electronic pen 305, or both the physical display and a projected display. Determining displays used 404 in configuration 402 also may include determining whether the projected display in configuration 402 for aggregated user interface display 368 is a two-dimensional projected display or a three-dimensional holographic display. Determining location of projected display 406 in configuration 402 for aggregated user interface display 368 may include determining a direction from electronic pen 305 for projecting the projected display or otherwise determining a location for the projected display produced by electronic pen 305 in configuration 402 for aggregated user interface display 368. Determining content information distribution 408 in configuration 402 for aggregated user interface display 368 includes determining a distribution of content information 315 from computing device 304 for display between the physical display and a projected display in configuration 402 of aggregated user interface display 368.

Aggregated user interface display engine 400 is configured to receive operator interactions 410 with aggregated user interface display 368, sensor information 412 and content information 315 from computing device 304, and sensor information 414 from electronic pen 305. Operator interactions 410, sensor information 412, 414, and content information 315 received over time are processed by aggregated user interface display engine 400 and saved as historical information 416 in historical information database 417. Historical information database 417 may be implemented in any appropriate manner and using any appropriate data structure for storing historical information 416.

Historical information 416 is used by predictor 418 to predict how operator 302 will interact with content information 315 from computing device 304. Based on this prediction, aggregated user interface display generator 420 will determine automatically configuration 402 for aggregated user interface display 368 for displaying content information 315 to operator 302 and will provide controls 422 for controlling computing device 304 and electronic pen 305 to implement configuration 402 for aggregated user interface display 368.

Operator interactions 410 may include any interactions of operator 302 with aggregated user interface display 368. Operator interactions 410 may include set up interactions 424 and operational interactions 426. Set up interactions 424 include interactions of operator 302 with aggregated user interface display 368 to set up aggregated user interface display 368 or to set up the automatic control of aggregated user interface display 368 by aggregated user interface display engine 400. Set up interactions 424 also may include interactions of operator 302 with computing device 304 or electronic pen 305 to set up aggregated user interface display 368 that do not include interactions with aggregated user interface display 368. For example, without limitation, set up interactions 424 may include interactions of operator 302 for operator identification 428, operator opt-in 430, and manual configuration 432. For example, without limitation, operational interactions 426 include interactions of operator 302 with content information 315 produced by applications running on computing device 304 and displayed on aggregated user interface display 368.

In accordance with an illustrative embodiment, aggregated user interface display engine 400 provides personalized automatic configuration 402 of aggregated user interface display 368 for operator 302 of computing device 304 based on historical interactions of operator 302 with aggregated user interface display 368. This personalization of aggregated user interface display 368 for operator 302 requires identification of operator 302 that is currently using computing device 304 and interacting with aggregated user interface display 368. Operator identification 428 may include any appropriate method of identifying operator 302. For example, without limitation, operator identification 428 may include a known sign-in process whereby operator 302 is prompted to enter appropriate identification information by aggregated user interface display engine 400. Alternatively, or in addition, operator identification 428 may include obtaining the identification of operator 302 by aggregated user interface display engine 400 from information provided by operator 302 to sign in to computing device 304 or to an application running on computing device 304. A sign-in process for operator identification 428 also may be known as a login, logon, or sign-on process.

Aggregated user interface display engine 400 saves operator interactions 410 with aggregated user interface display 368 and other information as historical information 416 for use in automatically controlling aggregated user interface display 368. Some operators may not want such information to be saved and used. Operator opt-in 430 may prompt operator 302 to accept that operator interactions 410 and other information will be saved and used to provide automated control of aggregated user interface display 368. Historical information 416 thus may be gathered and saved by aggregated user interface display engine 400 only in response to approval by operator 302 via operator opt-in 430.

Manual configuration 432 may enable operator 302 to establish and change configuration 402 for aggregated user interface display 368 manually. For example, upon first running aggregated user interface display engine 400, operator 302 may use manual configuration 432 of aggregated user interface display 368 until enough historical information 416 is saved by aggregated user interface display engine 400 to determine configuration 402 for aggregated user interface display 368 automatically. Operator 302 also may use manual configuration 432 of aggregated user interface display 368 to change configuration 402 of aggregated user interface display 368 manually in response to aggregated user interface display engine 400 automatically implementing configuration 402 of aggregated user interface display 368 that is not acceptable to operator 302. Furthermore, operator 302 may use manual configuration 432 of aggregated user interface display 368 if operator 302 does not agree at operator opt-in 430 to the saving of historical information 416 for operator 302 for automatically determining configuration 402 of aggregated user interface display 368 by aggregated user interface display engine 400.

Operational interactions 426 of operator 302 with content information 315 displayed on aggregated user interface display 368 preferably are saved as historical operator interactions 434 in historical information 416 in the context of types 436 of content information 315 displayed on aggregated user interface display 368 and interacted with by operator 302. Aggregated user interface display engine 400 may include content type identifier 438 for determining automatically types 436 of content information 315 displayed on aggregated user interface display 368 and interacted with by operator 302. Content type identifier 438 may be configured to determine types 436 of content information 315 in any appropriate manner. For example, without limitation, content type identifier 438 may use natural language processing 440 or another appropriate method to determine types 436 of content information 315 that includes words. Content type identifier 438 may use convolutional neural network 442 or another appropriate method to determine types 436 of content information 315 that includes images. Information identifying types 436 of content information 315 as determined by content type identifier 438 then may be saved along with information identifying operational interactions 426 with that content information as historical operator interactions 434.

Historical information 416 also may include information identifying historical grip patterns 444 of operator 302 holding electronic pen 305 as operator 302 performs operator interactions 410. Sensor information 414 received by aggregated user interface display engine 400 from electronic pen 305 may include grip information 446. Grip information 446 may be provided by appropriate grip sensors 346 in electronic pen 305, as described above. Aggregated user interface display engine 400 may include grip pattern identifier 448. Grip pattern identifier 448 may be configured to determine grip pattern 450 of operator 302 holding electronic pen 305 in any appropriate manner from grip information 446 provided by electronic pen 305. For example, without limitation, information identifying grip pattern 450 as determined by grip pattern identifier 448 may include information identifying one or more of when operator 302 picks up electronic pen 305, how operator 302 grips electronic pen 305, for how long operator 302 holds electronic pen 305, or any other information or combination of information related to the grip of operator 302 holding electronic pen 305. Information identifying grip pattern 450 as determined by grip pattern identifier 448 over time as operator 302 holds electronic pen 305 to interact with aggregated user interface display 368 may be saved as historical information 416 identifying historical grip patterns 444.

Historical information 416 also may include information identifying historical relative positions 452. For example, without limitation, historical relative positions 452 may include relative positions of electronic pen 305 and computing device 304 or physical display 314 on computing device 304 as operator 302 interacts with aggregated user interface display 368. As another example, historical relative positions 452 may include relative positions of operator 302 and one or more of electronic pen 305, computing device 304, or physical display 314 on computing device 304 as operator 302 interacts with aggregated user interface display 368.

Sensor information 412 and 414 received by aggregated user interface display engine 400 from computing device 304 and electronic pen 305 may include position information 454 and position information 456, respectively. Position information 454 may be provided by appropriate position sensors 318 in computing device 304, as described above. Position information 456 may be provided by appropriate position sensors 344 in electronic pen 305, as described above. Aggregated user interface display engine 400 may include relative positions identifier 458. Relative positions identifier 458 may be configured to determine relative positions 460 of electronic pen 305 and computing device 304 or physical display 314 on computing device 304 in any appropriate manner from position information 454 provided by computing device 304 and position information 456 provided by electronic pen 305. Information identifying relative positions 460 as determined by relative positions identifier 458 over time as operator 302 interacts with aggregated user interface display 368 may be saved as historical information 416 identifying historical relative positions 452.

In accordance with an illustrative embodiment, predictor 418 may use artificial intelligence 462 to predict how operator 302 will interact with content information 315 from computing device 304. For example, without limitation, predicted operator interaction 464 with content information 315 may be determined by providing content information 315 as input to recurrent neural network 466 that is trained using historical information 416. A recurrent neural network is good at capturing historical context to generate next context. Alternatively, prediction operator interaction 464 may be determined using an artificial neural network other than recurrent neural network 466.

Recurrent neural network 466 is trained by using historical information 416 to adjust parameters of recurrent neural network 466 to generate predicted operator interaction 464. For example, without limitation, recurrent neural network 466 may be trained with historical information 416 using reinforcement learning 468, such as Q-learning 470. Alternatively, other reinforcement learning 468 or other appropriate learning algorithms may be used to train recurrent neural network 466.

Predicted operator interaction 464 is a prediction, based on historical information 416, of how operator 302 will use aggregated user interface display 368 to interact with content information 315. Predicted operator interaction 464 thus defines a desirable configuration 402 for aggregated user interface display 368 for operator 302 to interact with content information 315. Aggregated user interface display generator 420 determines configuration 402 of aggregated user interface display 368 based on predicted operator interaction 464 and generates appropriate controls 422 for controlling computing device 304 and electronic pen 305 to implement configuration 402 of aggregated user interface display 368 for displaying content information 315.

Recurrent neural network 466 may be configured to indicate that predicted operator interaction 464 will happen with certain confidence level 472. Aggregated user interface display generator 420 may be configured to automatically determine and implement configuration 402 of aggregated user interface display 368 based on predicted operator interaction 464 only when confidence level 472 of predicted operator interaction 464 meets or exceeds confidence threshold 474. Confidence threshold 474 may be selected in any appropriate manner.

As operator 302 continues to interact with content information 315 displayed on aggregated user interface display 368, information identifying such interactions will continue to be gathered as historical information 416. As new historical information 416 of operator interactions 410 is obtained, it may be used to train recurrent neural network 466 to adjust the parameters of recurrent neural network 466 to improve predicted operator interaction 464. Ongoing operator interactions 410 with aggregated user interface display 368 therefore may provide a feedback loop for the automatic determination of configuration 402 of aggregated user interface display 368 by aggregated user interface display engine 400.

The illustration of aggregated user interface display engine 400 in FIGS. 4A and 4B is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5:
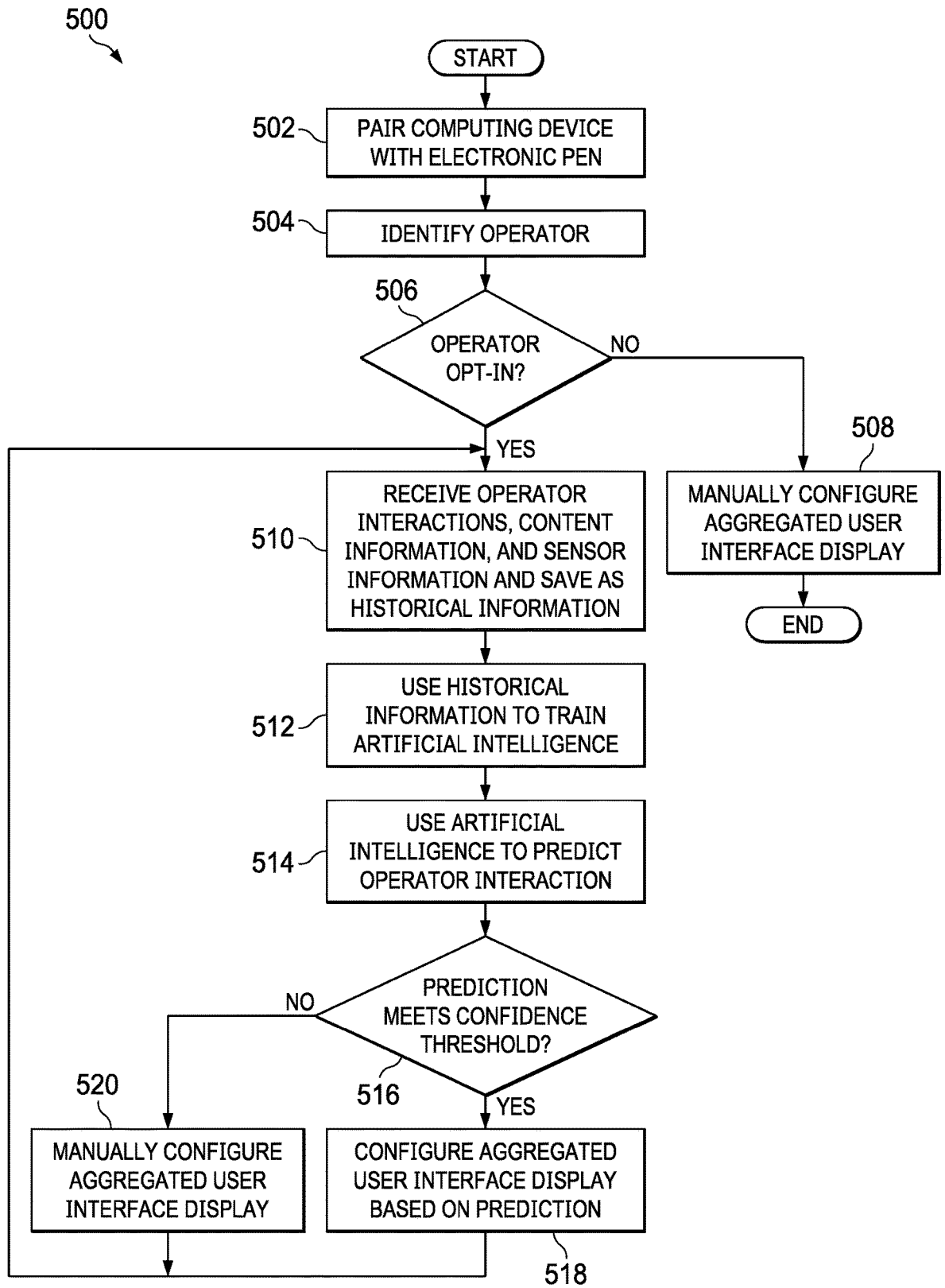
FIG. 5 is an illustration of a flowchart of a process for generating an aggregated user interface display in accordance with an illustrative embodiment.

Turning to FIG. 5, an illustration of a flowchart of process 500 for generating an aggregated user interface display is depicted in accordance with an illustrative embodiment. Process 500 may be implemented, for example, by aggregated user interface display engine 400 in FIGS. 4A and 4B.

Process 500 may begin with pairing a computing device with an electronic pen (operation 502). For example, without limitation, the computing device may be a mobile computing device or another appropriate computing device with a two-dimensional physical display. The electronic pen may be configured to project a three-dimensional holographic display, a two-dimensional projected display, or both a three-dimensional and a two-dimensional projected display. The aggregated user interface display may comprise the computing device physical display and the projected display from the electronic pen. The operator of the computing device may be identified (operation 504). For example, operation 504 may include a conventional sign-in process for identifying the operator. The operator then may be asked to opt-in to having information regarding operator interactions with the aggregated user interface display saved as historical information for automatically configuring the aggregated user interface display (operation 506). If the operator does not agree to opt-in at operation 506, the aggregated user interface display may not be configured automatically, and the operator may manually configure the aggregated user interface display (operation 508), with the process terminating thereafter.

In response to the operator agreeing to opt-in at operation 506, information regarding operator interactions with content information displayed on the aggregated user interface display and sensor information from the computer device and the electronic pen may then be received and saved as historical information (operation 510). The historical information is used to train artificial intelligence (operation 512). The artificial intelligence is used to predict operator interaction with content information (operation 514).

The predicted operator interaction determined at operation 514 may include a confidence level that the predicted operator interaction will happen. It may be determined whether the confidence level of the predicted operator interaction meets a confidence threshold (operation 516). In response to a determination that the predicted operator interaction does meet the confidence threshold, the aggregated user interface display may be configured automatically based on the prediction (operation 518). Configuring the aggregated user interface display at operation 518 may include one or more of determining the displays used in the aggregated user interface display, determining the location of the projected display in the aggregated user interface display, and distribution of content information for display between the computing device physical display and the projected display from the electronic pen in the aggregated user interface display. Process 500 then may continue with receiving and saving historical information at operation 510.

In response to a determination at operation 516 that the predicted operator interaction does not meet the confidence threshold, the aggregated user interface display may not be configured automatically, and the operator may manually configure the aggregated user interface display (operation 520). Process 500 then may continue with receiving and saving historical information at operation 510.

Figure 6:
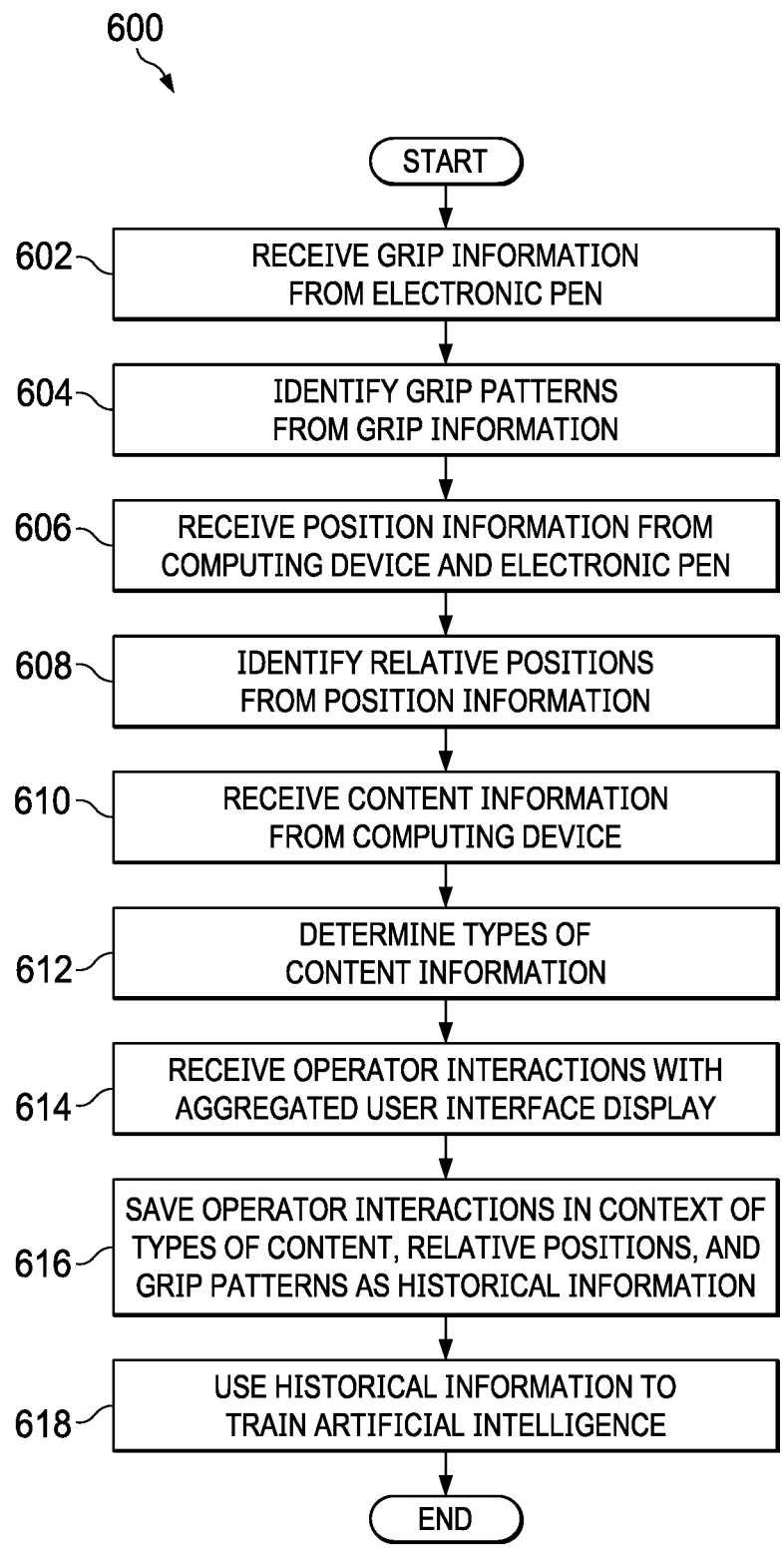
FIG. 6 is an illustration of a flowchart of a process for training artificial intelligence for generating an aggregated user interface display in accordance with an illustrative embodiment.

Turning to FIG. 6, an illustration of a flowchart of process 600 for training artificial intelligence for generating an aggregated user interface display is depicted in accordance with an illustrative embodiment. Process 600 is an example of one implementation of operations 510 and 512 in process 500 in FIG. 5 for training artificial intelligence for generating an aggregated user interface display including a computing device physical display and a projected display from an electronic pen.

Process 600 may begin with receiving grip information from the electronic pen (operation 602). The grip information may be provided by appropriate grip sensors in the electronic pen. The grip information may be used to determine grip patterns of an operator holding the electronic pen (operation 604).

Position information may be received from the computing device and the electronic pen (operation 606). The position information may be provided by appropriate position sensors in the computing device and the electronic pen. The position information may be used to determine relative positions of the computing device and the electronic pen (operation 608).

Content information may be received from the computing device (operation 610). Types of the content information then may be determined (operation 612).

Operator interactions with the content information displayed on the aggregated user interface display are received (operation 614). Information identifying the operator interactions with the aggregated user interface display in the context of the types of content information displayed, the relative positions, and the grip patterns is saved as historical information (operation 616). The historical information is used to train the artificial intelligence (operation 618), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 7:
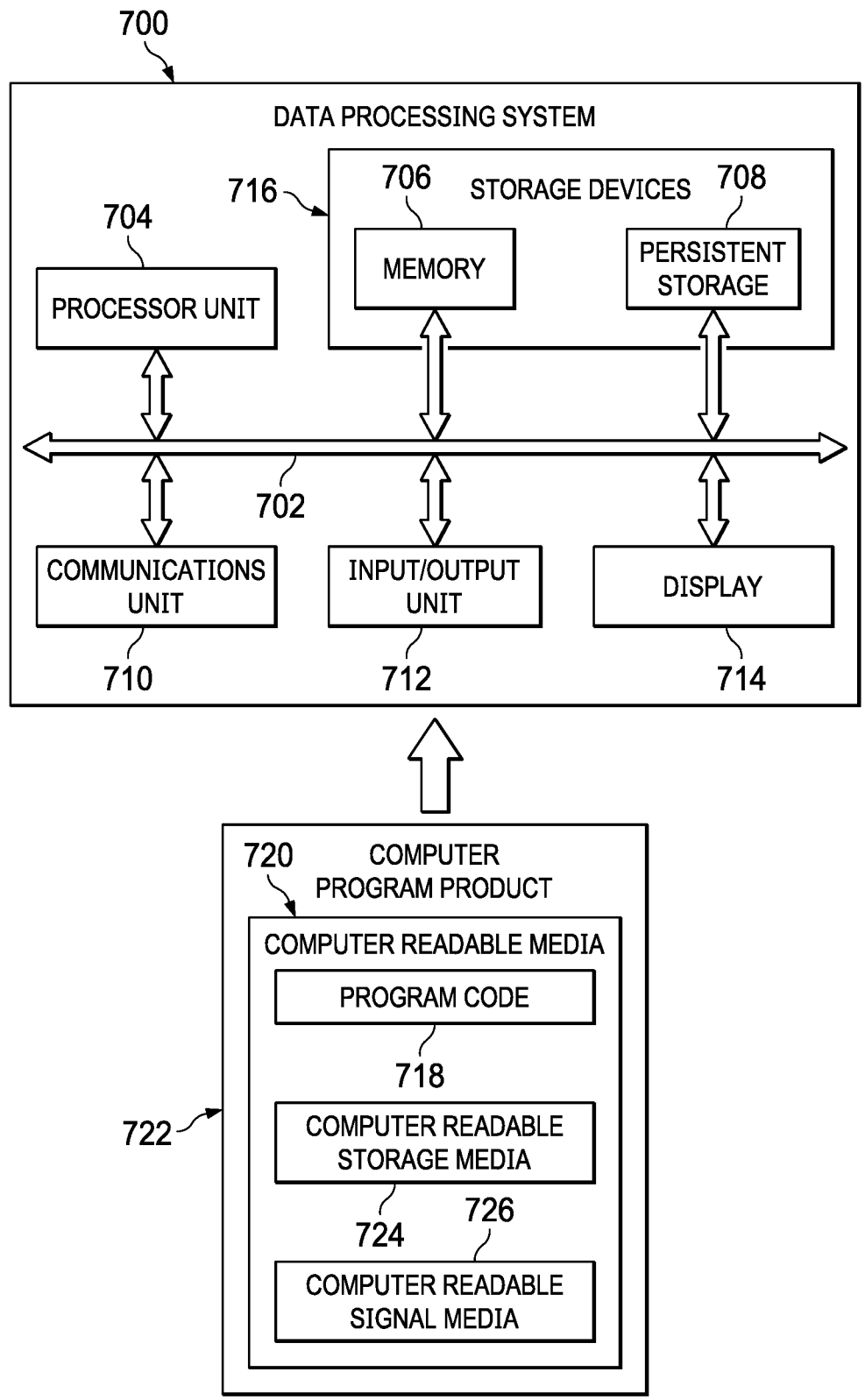
FIG. 7 is a block diagram of a data processing system in accordance with an illustrative embodiment.

Turning to FIG. 7, a block diagram of a data processing system is depicted in accordance with an illustrative embodiment. Data processing system 700 can be used to implement server computer 104, server computer 106, client computer 110, client computer 112, and client computer 114 in FIG. 1. Data processing system 700 can also be used to implement one or more of computing device 200 in FIG. 2 or computing device 304 in FIG. 3. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 704 can may be implemented using one or more heterogeneous processor systems in which a main processor is present with secondary processors on a single chip. As another illustrative example, processor unit 704 can be a symmetric multi-processor system containing multiple processors of the same type on a single chip.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program code, computer usable program code, or computer-readable program code that can be read and executed by a processor in processor unit 704. The program code in the different embodiments can be embodied on different physical or computer-readable storage media, such as memory 706 or persistent storage 708.

Program code 718 is located in a functional form on computer-readable media 720 that is selectively removable and can be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724.

In these illustrative examples, computer-readable storage media 724 is a physical or tangible storage device used to store program code 718 rather than a medium that propagates or transmits program code 718.

Alternatively, program code 718 can be transferred to data processing system 700 using a computer-readable signal media. The computer-readable signal media can be, for example, a propagated data signal containing program code 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 700 are not meant to provide architectural limitations to the manner in which different embodiments can be implemented. In some illustrative examples, one or more of the components may be incorporated in or otherwise form a portion of, another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program code 718.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of generating an aggregated user interface display, comprising:
   receiving operator interactions with the aggregated user interface display, wherein the aggregated user interface display comprises a physical display of a computing device and a projected display from an electronic pen;
   saving the operator interactions as historical information;
   using the historical information to determine a configuration for the aggregated user interface display; and
   controlling the computing device and the electronic pen to implement the configuration for the aggregated user interface display,
   and further comprising at least one of:
   receiving sensor information from the electronic pen, determining a grip pattern for an operator holding the electronic pen from the sensor information, and saving the grip pattern as the historical information;
   receiving sensor information from the computing device and the electronic pen, determining relative positions of the computing device and the electronic pen from the sensor information, and saving the relative positions as the historical information; or
   receiving content information from the computing device, determining types of the content information, and saving the operator interactions in context of the types of the content information as the historical information.

2. The computer-implemented method of claim 1, wherein the computing device is a mobile computing device selected from the group of mobile computing devices consisting of a smartphone and a tablet computer.

3. The computer-implemented method of claim 1, wherein:
   the projected display from the electronic pen comprises a three-dimensional holographic display; and
   the operator interactions with the aggregated user interface display include operator interactions with the three-dimensional holographic display using the electronic pen.

4. The computer-implemented method of claim 1, wherein using the historical information to determine the configuration for the aggregated user interface display comprises using the historical information to determine at least one of:
   whether the aggregated user interface display comprises only the physical display, only the projected display, or both the physical display and the projected display;
   whether the projected display comprises a two-dimensional projected display or a three-dimensional holographic display;
   a location for the projected display; or
   a distribution of content information from the computing device for display between the physical display and the projected display.

5. The computer-implemented method of claim 1, wherein using the historical information to determine the configuration for the aggregated user interface display comprises:
   using the historical information to train artificial intelligence; and
   using the artificial intelligence to determine the configuration for the aggregated user interface display.

6. The computer implemented method of claim 1, wherein using the historical information to determine the configuration for the aggregated user interface display comprises:
   using the historical information to train a recurrent neural network;
   using the recurrent neural network to predict an operator interaction with the aggregated user interface display; and
   using the predicted operator interaction to determine the configuration for the aggregated user interface display.

7. The computer-implemented method of claim 1, wherein:
   the projected display from the electronic pen comprises a two-dimensional display; and
   the operator interactions with the aggregated user interface display include operator interactions with the two-dimensional display using the electronic pen.

8. A system for generating an aggregated user interface display,
   the system comprising:
   a physical display;
   an electronic pen that generates a projected display; and
   a computing device communicatively coupled with the physical display,
   the computing device configured to:
   receive operator interactions with the aggregated user interface display;
   save the operator interactions as historical information;
   use the historical information to determine a configuration for the aggregated user interface display; and
   control the computing device and the electronic pen to implement the configuration for the aggregated user interface display,
   wherein the computing device is further configured to:
   receive sensor information from the electronic pen, determine a grip pattern for an operator holding the electronic pen from the sensor information, and save the grip pattern as the historical information;
   receive sensor information from the computing device and the electronic pen, determine relative positions of the computing device and the electronic pen from the sensor information, and save the relative positions as the historical information; or
   receive content information from the computing device, determine types of the content information, and save the operator interactions in context of the types of the content information as the historical information.

9. The system of claim 8, wherein the computing device is a mobile computing device selected from the group of mobile computing devices consisting of a smartphone and a tablet computer.

10. The system of claim 8, wherein:
    the projected display from the electronic pen comprises a three-dimensional holographic display; and
    the operator interactions with the aggregated user interface display include operator interactions with the three-dimensional holographic display using the electronic pen.

11. The system of claim 8, wherein the computing device is configured to use the historical information to determine the configuration for the aggregated user interface display by using the historical information to determine at least one of:

whether the aggregated user interface display comprises only the physical display, only the projected display, or both the physical display and the projected display;

whether the projected display comprises a two-dimensional projected display or a three-dimensional holographic display;

a location for the projected display; or a distribution of content information from the computing device for display between the physical display and the projected display.

12. The system of claim 8, wherein the computing device is configured to:
use the historical information to train artificial intelligence; and
use the artificial intelligence to determine the configuration for the aggregated user interface display.

13. The system of claim 8, wherein the computing device is configured to:
use the historical information to train a recurrent neural network;
use the recurrent neural network to predict an operator interaction with the aggregated user interface display; and
use the predicted operator interaction to determine the configuration for the aggregated user interface display.

14. The system of claim 8, wherein:
the projected display from the electronic pen comprises a two-dimensional display; and
the operator interactions with the aggregated user interface display include operator interactions with the two-dimensional display using the electronic pen.

15. A computer program product for generating an aggregated user interface display, the computer program product comprising a computer readable storage medium having program instructions embodied therewith, the program instructions executable by a device to cause the device to:
receive operator interactions with the aggregated user interface display, wherein the aggregated user interface display comprises a physical display of a computing device and a projected display from an electronic pen;
save the operator interactions as historical information;
use the historical information to determine a configuration for the aggregated user interface display; and
control the computing device and the electronic pen to implement the configuration for the aggregated user interface display,
wherein the program instructions are executable by the device to further cause the device to:
receive sensor information from the electronic pen, determine a grip pattern for an operator holding the electronic pen from the sensor information, and save the grip pattern as the historical information;
receive sensor information from the computing device and the electronic pen, determine relative positions of the computing device and the electronic pen from the sensor information, and save the relative positions as the historical information; or
receive content information from the computing device, determine types of the content information, and save the operator interactions in context of the types of the content information as the historical information.

16. The computer program product of claim 15, wherein the computing device is a mobile computing device selected from the group of mobile computing devices consisting of a smartphone and a tablet computer.

17. The computer program product of claim 15, wherein:
the projected display from the electronic pen comprises a three-dimensional holographic display; and
the operator interactions with the aggregated user interface display include operator interactions with the three-dimensional holographic display using the electronic pen.

18. The computer program product of claim 15, wherein the program instructions are executable by the device to cause the device to use the historical information to determine the configuration for the aggregated user interface display by using the historical information to determine at least one of:
whether the aggregated user interface display comprises only the physical display, only the projected display, or both the physical display and the projected display;
whether the projected display comprises a two-dimensional projected display or a three-dimensional holographic display;
a location for the projected display; or
a distribution of content information from the computing device for display between the physical display and the projected display.

19. The computer program product of claim 15, wherein the program instructions are executable by the device to cause the device to:
use the historical information to train artificial intelligence; and
use the artificial intelligence to determine the configuration for the aggregated user interface display.

20. The computer program product of claim 15, wherein:
the projected display from the electronic pen comprises a two-dimensional display; and
the operator interactions with the aggregated user interface display include operator interactions with the two-dimensional display using the electronic pen.

* * * * *